(Model.)
J. F. A. WINKELMANN & M. L. STEWART.
VEHICLE REACH.
No. 272,929. Patented Feb. 27, 1883.
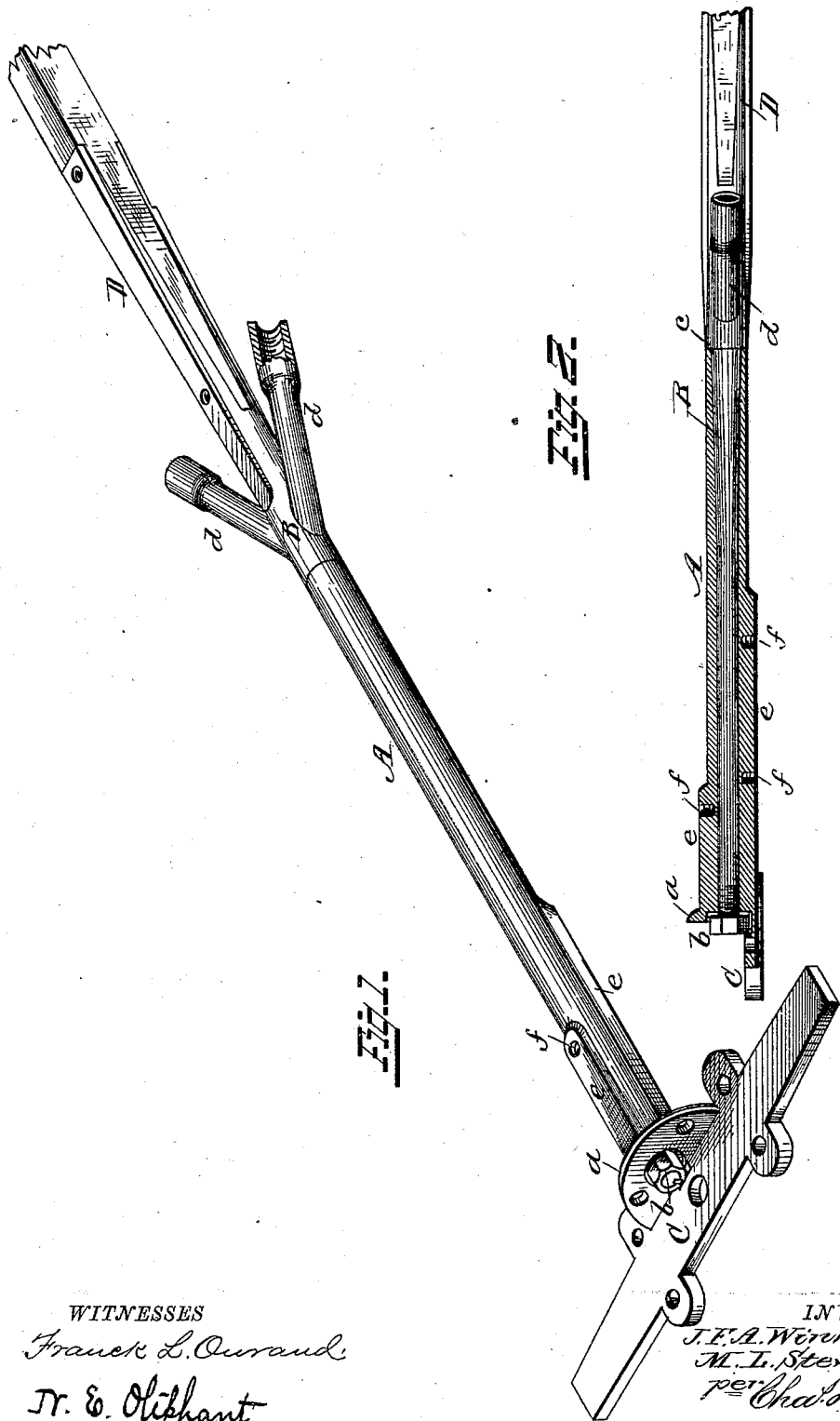
WITNESSES
Franck L. Ourand.
N. E. Oliphant
INVENTORS
J. F. A. Winkelmann
M. L. Stewart
per Chas. H. Fowler
Attorney

UNITED STATES PATENT OFFICE.

JOHANN F. A. WINKELMANN AND MADISON L. STEWART, OF SCHELL CITY, MISSOURI.

VEHICLE-REACH.

SPECIFICATION forming part of Letters Patent No. 272,929, dated February 27, 1883.

Application filed November 15, 1882. (Model.)

*To all whom it may concern:*

Be it known that we, JOHANN F. A. WINKELMANN and MADISON L. STEWART, citizens of the United States, residing at Schell City, in the county of Vernon and State of Missouri, have invented certain new and useful Improvements in Reaches or Couplings for Vehicles; and we do hereby declare that the following is a full, clear, and exact description of the same, reference being had to the annexed drawings, making a part of this specification, and to the letters and figures of reference marked thereon.

Figure 1 of the drawings is a perspective view of our invention; and Fig. 2, a side elevation thereof, partly in section.

The present invention has relation to certain new and useful improvements in that class of running-gear for vehicles in which a tapering spindle is inserted in a correspondingly-tapering hollow section or tube, which together form the reach.

The invention has for its object to improve the construction of the above-mentioned class of running-gear; and it consists in the details of construction, substantially as shown in the drawings and hereinafter described and claimed.

In the accompanying drawings, A represents one section of the reach, cast hollow to receive the section B, hereinafter described. The tubular section A, at its forward end, is cast with a horizontal plate, C, and vertical plate $a$, said plates having suitable screw or bolt holes for connecting thereto, by suitable means, the head-block of the vehicle. The section A, with the plates C $a$, are all cast together in one piece, preferably of malleable iron, thus making not only a simpler but stronger reach-section, and less cumbersome than those in ordinary use, the cast plates at the forward end presenting a firm and solid means for attaching thereto the head-block. The forward end of the tubular section A is cast with a seat for the screw-nut $b$, said nut engaging with the screw-threaded end of the section B to hold it within the tubular section. The opening in the rear or inner end of the section is slightly tapering to conform to the taper of the section B, said section being cast with a shoulder, $c$, and tubular screw-threaded branches $d$, for attaching thereto the necessary braces, and the forked or bifurcated end D, for securing the wood portion of the reach. The tubular section A, at its forward end, upon both its upper and lower sides, is cast with plates $e$, with screw-threaded holes $f$ for the braces. The taper upon the sections A B enables the wear to be taken up by the nut $b$, said nut being keyed to the screw-threaded end of the section B, to prevent it from accidentally turning or being loosened by the working of the parts.

The tubular screw-threaded branches $d$, being cast with the tapering section B, form a very simple and practical means of attaching thereto the necessary braces, which heretofore have usually been riveted or bolted directly to the sides of the section, thereby not only weakening it by drilling holes through it for the bolts or rivets, but rendering such means of connection liable to work loose or break off at the point of juncture with the section, as well as requiring more time, trouble, and experience in securing the braces in a proper manner to the section. It will be seen that these several disadvantages above enumerated are entirely removed by casting the section B with the tubular branches $d$, having internal screw-threads, and arranged at an acute angle with the section, so that the braces which have screw-threaded ends may be readily connected to the tubular branches without the necessity of riveting or bolting, as heretofore, thus making a stronger and much neater connection with less trouble, and reducing the cost of manufacture.

Having now fully described our invention, what we claim as new, and desire to secure by Letters Patent, is—

1. The combination, with the tubular section A, having a tapering opening, of the tapering section B, cast with tubular internal screw-threaded branches, $d$, substantially as and for the purpose set forth.

2. The section A, having a tapering opening or bore and cast with flat surfaces or plates $e$, and plates C $a$, in combination with the tapering section B, cast with tubular internal branches, $d$, substantially as and for the purpose specified.

In testimony that we claim the above we have hereunto subscribed our names in the presence of two witnesses.

JOHANN FRIEDRICH AUGUST WINKELMANN.
MADISON LAVERN STEWART.

Witnesses:
  W. F. MARING,
  P. R. HARRIS.